United States Patent [19]

Ishioka et al.

[11] 4,172,503
[45] Oct. 30, 1979

[54] OFFSET TYPE TRACTOR

[75] Inventors: Tetsuo Ishioka, Wakayama; Yasunobu Yamaue, Izumi; Hisao Kawagoe, Hirakata, all of Japan

[73] Assignee: Kubota, Ltd., Osaka, Japan

[21] Appl. No.: 904,919

[22] Filed: May 3, 1978

[30] Foreign Application Priority Data

Oct. 20, 1977 [JP] Japan .................. 52-142121

[51] Int. Cl.$^2$ .................................................. B62D 1/18
[52] U.S. Cl. .................................... 180/313; 74/493; 180/78; 280/775
[58] Field of Search ............ 280/775, 779; 180/77 R, 180/77 S, 78, 1 F; 74/493

[56] References Cited

U.S. PATENT DOCUMENTS

| 3,023,818 | 3/1962 | Miller et al. ............... 180/1 F X |
| 3,198,030 | 8/1965 | Miller et al. ............... 280/775 X |
| 3,533,302 | 10/1970 | Hansen ....................... 180/78 X |
| 3,580,101 | 5/1971 | Jorgensen et al. ........ 280/775 X |
| 4,076,091 | 2/1978 | Forster ...................... 280/775 X |

Primary Examiner—Joseph F. Peters, Jr.
Assistant Examiner—Michael Mar
Attorney, Agent, or Firm—Haseltine, Lake & Waters

[57] ABSTRACT

An offset type tractor having a driving assembly such as an engine and a transmission case, and a supporting frame therefor are eccentrically disposed at either side with respect to the center line of the tractor body width, while a control wheel and a driver's seat are disposed on the center line of the tractor body width. A control wheel, a supporting post of a turned structure for supporting the control wheel, and an adjusting structure for adjusting the control wheel in the direction close to and away from the driver.

4 Claims, 8 Drawing Figures

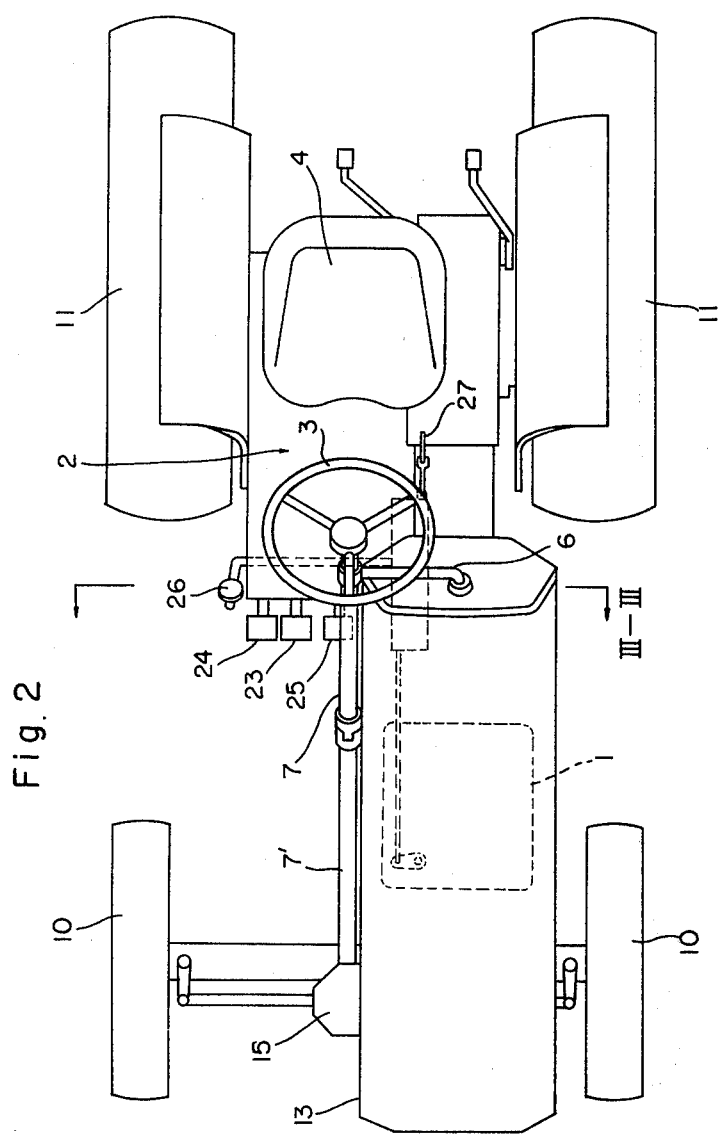

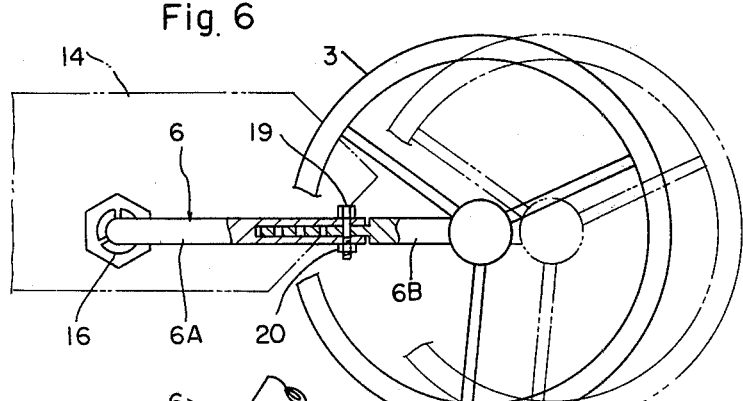
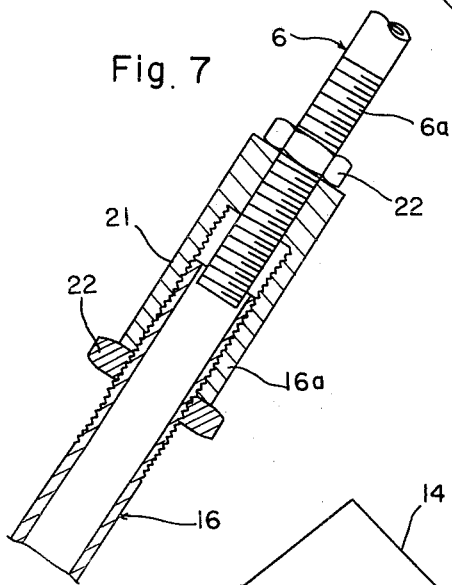
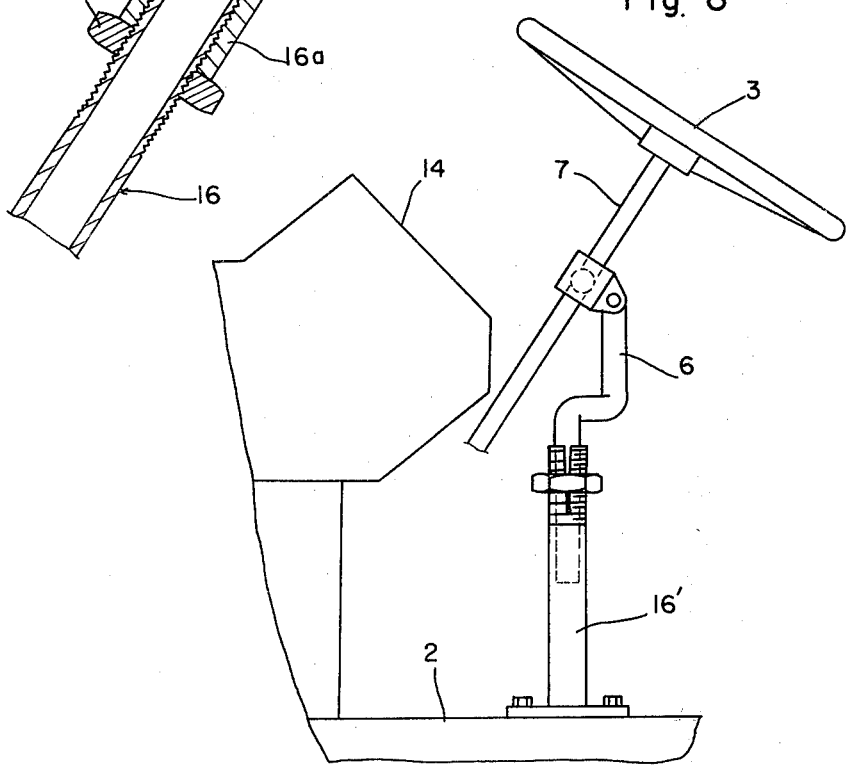

OFFSET TYPE TRACTOR

BACKGROUND OF THE INVENTION

The present invention relates to improvements in an offset type tractor.

An offset type tractor has been developed so that a ground working machine such as cultivator may readily be mounted adjacent to the center of the tractor body and its working status may well be watched from the driver's seat. In such a tractor, driving means such as an engine and a transmission case, and a supporting frame therefor are eccentrically disposed at either side with respect to the center line of the tractor body width while a control wheel and a driver's seat are disposed on the center line of the tractor body width.

The control wheel is consequently supported by a supporting post extended from a portion of the tractor body toward the virtual center line of the tractor body. Namely, the steering shaft of the control wheel is disposed at a place different from the mounting place of the supporting post. It subsequently makes difficult to provide a structure which may adjust the control wheel in the direction close to or away from a driver according to his physical features.

In addition, because a working machine is attached to the tractor at the position in front of and below the control wheel, a steering mechanism for travelling wheels cannot be located at this position but located adjacent to the front travelling wheels. This also causes the control wheel connected to the steering shaft to be disposed at a place different from the supporting post mounting place.

SUMMARY OF THE INVENTION

In such a special construction of the offset type tractor as abovementioned, it is an object of the present invention to adjust the control wheel so that a driver may readily operate it without such fatigue at a suitable position according to his physical features, and to operate the control wheel in a manner to watch readily and securely a ground working machine attached to the tractor in front of the driver's seat and at the side part with respect to the engine and the transmission case.

In order to achieve the object abovementioned, in an offset type tractor wherein driving means such as an engine and a transmission case, and a supporting frame therefor are eccentrically disposed at either side with respect to the center line of the tractor body width, while a control wheel and a driver's seat are disposed on the center line of the tractor body width, said offset type tractor comprises a first steering shaft having one end connected to the control wheel, a universal joint connected to the other end of the first steering shaft, a second steering shaft having one end connected to the universal joint and the other end connected to a steering mechanism, a supporting post of a turned structure extended from that portion of said tractor body which is different from the mounting place of the first steering shaft, toward the center of the tractor body width, and for supporting the first steering shaft, and an adjusting means for adjusting the control wheel in the direction close to and away from a driver sitting on the driver's seat.

With these arrangements, the control wheel may be adjusted at a position where the driver may readily operate it, by operating the adjusting means so that the control wheel be close to or away from the driver according to his physical features. This permits easier steering as well as good supervision on the working status of a ground working machine attached to the tractor, thus giving full play to the functions of the offset type tractor.

Other objects and advantages of the present invention will be apparent from the following description.

BRIEF DESCRIPTION OF THE DRAWINGS

Some embodiments of offset type tractor in accordance with the present invention will then be described, by way of example, with reference to the accompanying drawings in which:

FIG. 2 is a plan view of the tractor in FIG. 1;

FIGS. 6 to 8 show another embodiments of a present invention, respectively, FIG. 6 being a plan view partially broken away of main portions, FIG. 7 being an enlarged longitudinal side view of main portions and FIG. 8 being an enlarged side view of main portions.

DESCRIPTION OF THE PREFERRED EMBODIMENTS

Figure 1:
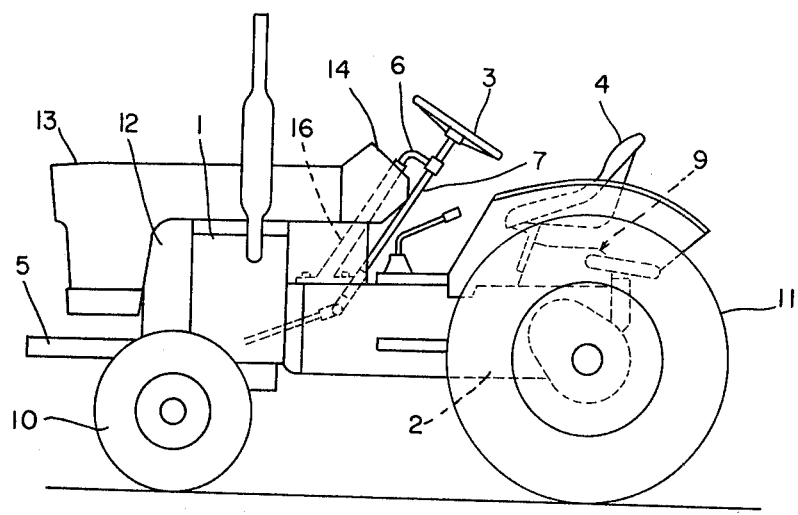
FIG. 1 is a side view of a tractor in accordance with the present invention.
Figure 3:
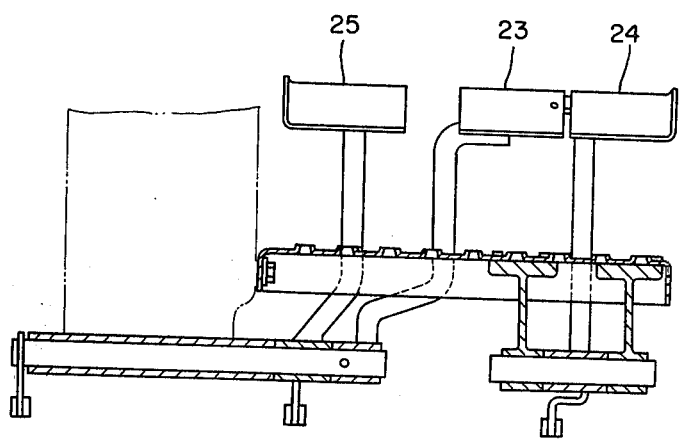
FIG. 3 is a section view taken along the line III—III in FIG. 2.

With reference to FIGS. 1 to 3, description will then be made of an offset type tractor in accordance with the present invention.

Driving means such as an engine 1, a transmission case 2 and a hydraulic mechanism 9 for lifting and lowering a ground working machine (not shown) to be connected to the rear part of the tractor, and a supporting frame 5 therefor are eccentrically disposed at either side with respect to a virtual center line of the tractor body width, which passes through the center of the distance between a pair of front wheels 10 and between a pair of rear wheels 11.

A control wheel 3 and a driver's seat 4 are disposed on the center line of the tractor body width. A supporting post 6 of a turned structure holds first and second steering shafts 7 and 7' connecting the control wheel 3 to a steering mechanism 15 which controls the travelling of the front wheels 10. This supporting post 6 is extended from a control panel 14 disposed at the rear part of a hood 13 covering the upper portion of a radiator 12 and the engine 1, toward the driver's seat side.

As best shown in FIG. 3, there are disposed travelling system left and right brake pedals 23 and 24 and a main clutch operating pedal 25. They are located as shown in FIG. 2 when taken in a plan view. An accelerator pedal 26 is disposed at the side with respect to the travelling system right brake pedal 24 as shown in FIG. 3. An accelerator level 27 interlockingly connected to the accelerator pedal 26 is disposed at the side with respect to the driver's seat 4.

Figure 4:
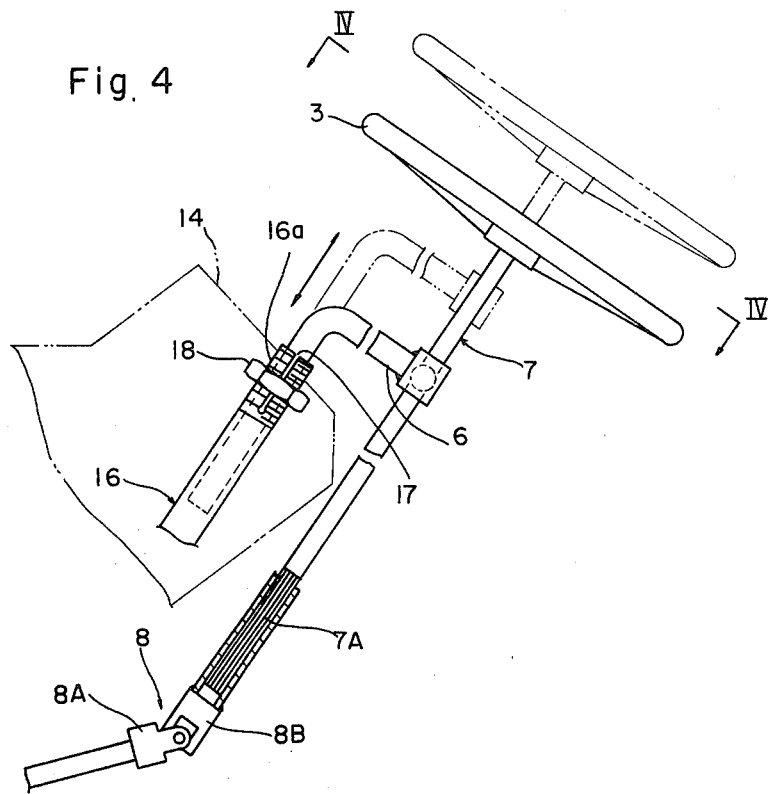
FIG. 4 is an enlarged side view partially broken away of main portions.
Figure 5:
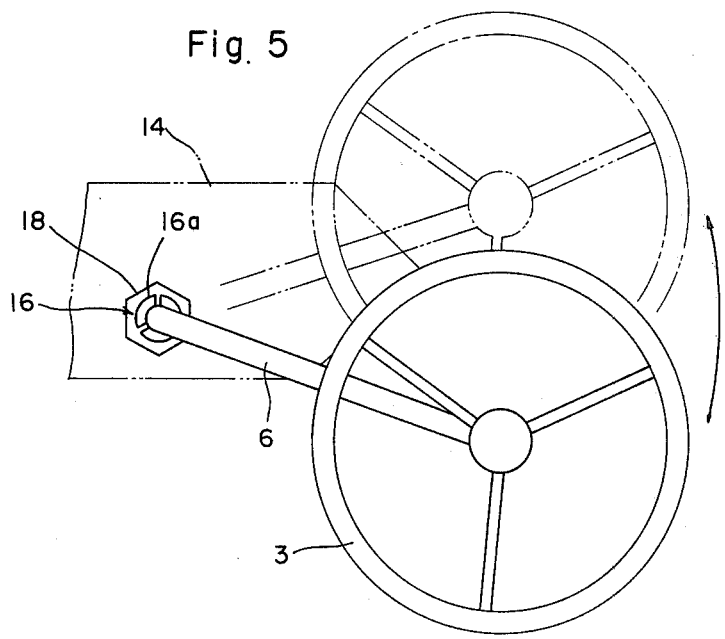
FIG. 5 is a fragmentary view when taken along the line V—V in FIG. 4.

As shown in FIG. 4, a universal joint 8 is disposed between the first and second steering shafts 7 and 7', and comprises joint members 8A and 8B. The joint member 8B disposed at the control wheel side is splined and slidably fitted to the portion 7a of the first steering shaft 7.

The supporting post 6 is attached, in a retractable, rotatable and fixable manner, to a cylindrical fixed support 16 which is inclinedly extended from the transmission case 2 to the control panel 14. With this arrangement, the position of the control wheel 3 may vertically and transversely be adjusted by stretching or pushing the supporting post 6 axially of the fixed support 16, and rotating the supporting post 6 around the axis of the fixed support 16. Namely, an adjusting means for adjusting the control wheel 3 in the direction close to and away from the driver, is constituted by the construction abovementioned in which the supporting post 6 may be retracted and rotatable with respect to a portion of the tractor body and may be fixed at a desired position, a ball joint of a well-known structure per se which supports the first steering shaft 7 to the supporting post 6, and the retractable construction of the first steering shaft.

Description will then be made of a mounting structure in which the supporting post 6 is supported by the fixed support 16 in a manner retractable, rotatable and fixable with respect thereto.

The fixed support 16 is provided at the upper threaded portion 16a thereof with an axial groove 17 of a suitable length, and this upper threaded portion 16a is flared in the direction toward the tip end thereof. With this arrangement, the supporting post 6 inserted in the upper threaded portion 16a may be fixed at a predetermined position in a predetermined direction by radially internal fastening of the upper threaded portion 16a followed by the fastening operation of a nut 18 which has been threaded into the upper threaded portion 16a of the fixed support 16.

In FIG. 6 showing a modification of the adjusting means, the supporting post 6 is constituted by a L-shape member 6A attached to the fixed support 16 and a supporting member 6B into which the steering shaft 7 is inserted. These L-shaped member 6A and the supporting member 6B movable transversely of the tractor body may be fixed to each other by a bolt 19 and a nut 20. Thus, the control wheel 3 may also be adjusted transversely of the tractor body by selectively inserting the bolt 19.

FIG. 7 shows another mounting structure in which the supporting post 6 is supported by the fixed support 16 in a manner retractable, rotatable and fixable with respect thereto.

Namely, the supporting post 6 is threaded into a threaded member 21 which has been threaded into the upper left hand threaded portion 16a of the fixed support 16. Lock nuts 22 are threaded into the upper left hand threaded portion 16a of the fixed support 16, and the right hand threaded portion 16a of the supporting post 6, respectively. Thus, the position of the control wheel 3 may transversely and vertically be adjusted by rotation of the supporting post 6 and movement thereof in a direction close to and away from the fixed support 16 followed by rotation of the threaded member 21.

Although the supporting post 6 has been attached through the fixed support 16 inclinedly disposed from the transmission case 2 to the control panel 14 in the embodiments discussed hereinbefore, it will be appreciated that as shown in FIG. 8 the supporting post 6 may also be attached through the fixed support 16 upwardly extended from the transmission case 2 through the space between the driver's seat 4 and the control panel 14.

It will be understood that variations and modifications of the adjusting means for adjusting the control wheel 3 in the direction close to and away from the driver may be made without departing from the present invention.

We claim:

1. An improved offset type tractor apparatus having driving means, including; an engine and a transmission case, and a supporting frame, said driving means being eccentrically disposed at either side with respect to the center line of the tractor body width, a control wheel and a driver's seat each are disposed on the center line of the tractor body width, said apparatus being further defined by a first steering shaft having one end connected to said control wheel, a universal joint connected to the other end of said first steering shaft; a second shaft having one and connected to said universal joint and the other end connected to a steering mechanism; a supporting post, said support post having a turned portion extending from a portion of said tractor body at a point transversely from the mounting place of said first steering shaft and toward the center of the tractor body width to support said first steering shaft, and adjusting means, said adjusting means being adapted to adjust said control wheel in the direction close to and away from a driver sitting on said driver's seat, said improvement comprising: said adjusting means having a structure in which said supporting post is rotatable about its own axis and fixable with respect to said portion of tractor body, a ball joint structure for supporting said first steering shaft with respect to said supporting post, wherein said first steering shaft can swing in a rotary arc about the axis of said supporting post.

2. An improved offset tractor apparatus as claimed in claim 1, wherein: said supporting post is retractable with respect to a portion of said tractor body.

3. An offset type tractor as set forth in claim 1, wherein said supporting post is so constructed as to be retractable and fixable between the turned portion thereof and said ball joint.

4. An offset type tractor as set forth in claim 3, wherein spline-engagement is utilized in said retractable structure of first steering shaft.

* * * * *